United States Patent
Juntunen

(10) Patent No.: US 7,673,809 B2
(45) Date of Patent: Mar. 9, 2010

(54) THERMOSTAT RELAY CONTROL

(75) Inventor: Robert D. Juntunen, Minnetonka, MN (US)

(73) Assignee: Honeywell International Inc., Morristown, NJ (US)

( * ) Notice: Subject to any disclaimer, the term of this patent is extended or adjusted under 35 U.S.C. 154(b) by 1061 days.

(21) Appl. No.: 11/162,124

(22) Filed: Aug. 30, 2005

(65) Prior Publication Data

US 2007/0045432 A1 Mar. 1, 2007

(51) Int. Cl.
*G05D 23/275* (2006.01)
*F16K 37/00* (2006.01)
*H01H 47/00* (2006.01)
*G05B 11/28* (2006.01)

(52) U.S. Cl. .................. 236/78 R; 361/170; 318/599; 236/78 A

(58) Field of Classification Search ............. 236/72, 236/78 A, 78 B, 78 R, 78 D; 165/167, 269; 361/170, 189; 455/313; 318/599, 606
See application file for complete search history.

(56) References Cited

U.S. PATENT DOCUMENTS

| | | | | |
|---|---|---|---|---|
| 3,344,850 A | * | 10/1967 | De Forest | 165/256 |
| 3,616,846 A | * | 11/1971 | Wills | 165/256 |
| 4,039,917 A | * | 8/1977 | Bach et al. | 318/599 |
| 4,049,973 A | | 9/1977 | Lambert | |
| 4,384,462 A | * | 5/1983 | Overman et al. | 62/175 |
| 5,957,374 A | * | 9/1999 | Bias et al. | 236/78 R |
| 6,089,310 A | * | 7/2000 | Toth et al. | 165/11.1 |
| 2002/0085333 A1 | | 7/2002 | Alexanian et al. | |
| 2003/0057888 A1 | * | 3/2003 | Archenhold et al. | 315/291 |

* cited by examiner

*Primary Examiner*—Chen-Wen Jiang

(57) ABSTRACT

The present invention, in illustrative embodiments, includes methods and devices for reducing power consumption in a thermostat by adjusting pulse levels (duration and/or voltage) that are used to control an HVAC relay in light of variations of ambient conditions or other relay conditions. In some illustrative embodiments, an ambient condition is observed using existing thermostat features, such as, for example, a temperature sensor, and used to adjust pulse parameters.

16 Claims, 6 Drawing Sheets

| T (Celsius) | V (Volts) | PW (ms) |
|---|---|---|
| 25 | 2.25 | 5 |
| 30 | 2.298 | 5.6 |
| 35 | 2.346 | 6.2 |
| 40 | 2.394 | 6.8 |
| 45 | 2.442 | 7.4 |
| 50 | 2.49 | 8 |

*FIG. 3A*

| T (Celsius) | V (Volts) | PW (ms) |
|---|---|---|
| 25 | 1.8 | 5 |
| 30 | 1.838 | 5.6 |
| 35 | 1.876 | 6.2 |
| 40 | 1.914 | 6.8 |
| 45 | 1.952 | 7.4 |
| 50 | 1.99 | 8 |

*FIG. 3B*

THERMOSTAT RELAY CONTROL

FIELD

The present invention is related to the field of control systems. More particularly, the present invention is related to thermostatic controls for enclosed spaces.

BACKGROUND

Consumers of heating, ventilation, and air conditioning (HVAC) control systems, particularly thermostats that may be placed in visible locations, have become more demanding as technology has advanced. Newer systems are expected to be compact, accessible, and low maintenance. Further, ease and cost of installation remains important. These factors have, in part, led to wider use of battery controlled thermostats. With the use of batteries, energy conservation within the thermostat itself has become important. Any step taken to reduce power consumption in a thermostat is an opportunity to improve existing devices.

SUMMARY

The present invention provides methods and systems for reducing power consumption of a thermostat or similar device by adjusting pulse levels (duration and/or amplitude) that are used to control one or more HVAC relays in light of variations in ambient conditions or other relay conditions. In some illustrative embodiments, an ambient condition is observed using existing thermostat components, such as, for example, a temperature sensor, and pulse parameters are adjusted.

BRIEF DESCRIPTION OF THE FIGURES

FIGS. 3A and 3B are charts illustrating empirical data related to example relays that may be used in conjunction with some illustrative embodiments;

DETAILED DESCRIPTION

The following detailed description should be read with reference to the drawings. The drawings, which are not necessarily to scale, depict illustrative embodiments and are not intended to limit the scope of the invention.

As used herein, an HVAC system may include a system having heating, ventilation, and/or air conditioning functionality. It is not necessary to the present invention that each of these elements be a part of the HVAC system. For example, a system having ventilation and air conditioning, without heating, may be considered an HVAC system. Likewise, a system having heating and ventilation, but not air conditioning, may be considered an HVAC system, and yet another system may have just heating and cooling components, but not a ventilation system. No particular heating, ventilation, and/or cooling system is required unless otherwise specifically noted.

Figure 1:
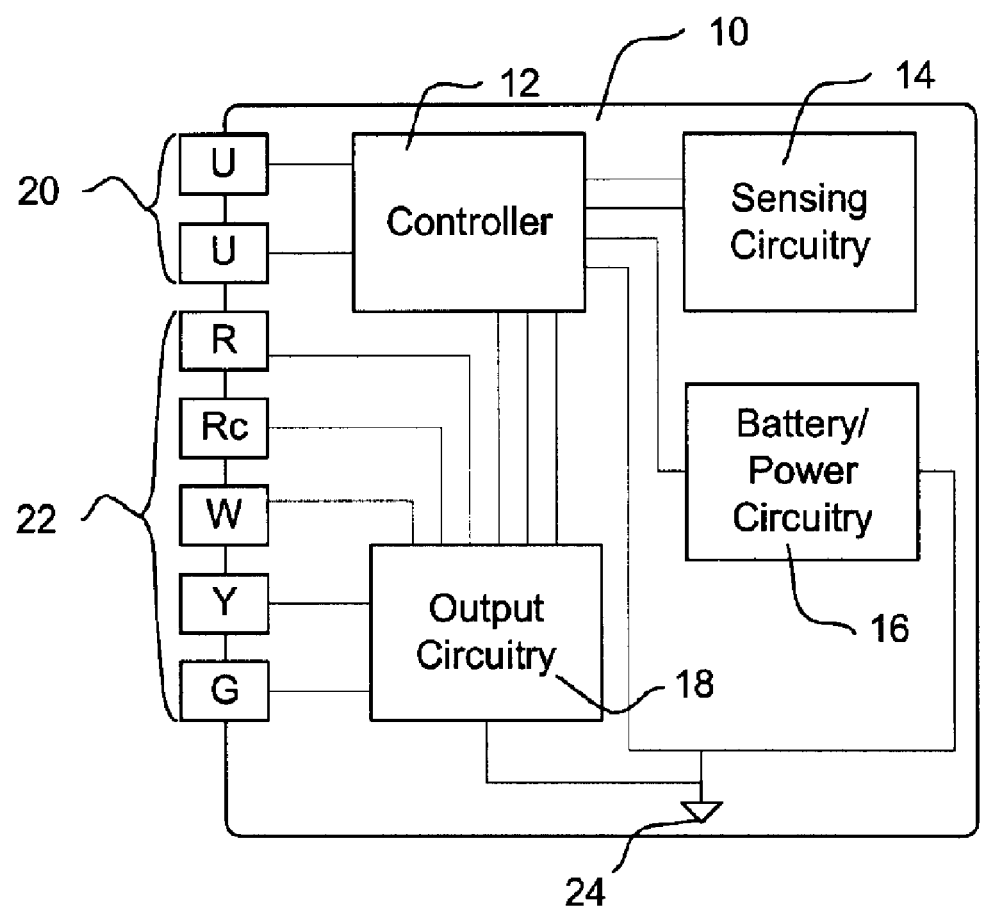
FIG. 1 is a block schematic for a thermostat.

FIG. 1 is a block schematic representation of an illustrative thermostat. The thermostat 10 includes a controller 12 that is coupled to sensing circuitry 14. The sensing circuitry 14 may include any suitable device for sensing ambient conditions including, for example, a temperature sensor, a humidity sensor, an occupancy sensor, a CO or $CO_2$ sensor, a particulate sensor, or any other suitable sensor, as desired. Battery and power circuitry 16 is also shown. As noted, the use of battery power for thermostats may make installation and/or retrofitting easier and cheaper, but also places an emphasis on energy efficiency.

Output circuitry 18 is also shown. Various inputs and outputs are shown in association with the thermostat 10 including user inputs 20, and various control ports 22. The illustration shows control ports 22 including power (R), cooling power ($R_C$), heating (W), cooling (Y), and fan (G). These ports are only illustrative, and it is contemplated that the ports 22 on the thermostat 10 may include different or other ports, as desired. A ground reference 24 for the thermostat 10 may be provided in any suitable fashion.

In some embodiments, the output circuitry 18 includes at least one relay. The relay, in some illustrative examples, may be a latching relay. Latching relays may be used to act as a current amplifier or current switch, as desired, and operate by receiving a pulse ON or OFF. Once either ON or OFF position, a latching relay remains ON or OFF until a pulse is received changing the latching relay to OFF or ON; no power is needed to keep the latching relay in one or the other position.

In some latching relays, a small current is passed through a coil which is wound on a bobbin around a magnetic core. The resulting magnetic force is able to bring two contacts together to form a switch that can carry a current, typically a larger current. Thus, with a relay, a smaller current carried through a small switch can be used to control a larger current. In some cases, a relay can be used to selectively couple or decouple an input and an output, which in some embodiments, allows a low voltage thermostat 10 to control a higher voltage component. If, for example, a copper or other common metallic metal is used in the coil, the resistance of the coil may rise with temperature. Thus, at higher temperatures, the voltage needed to create sufficient current to cause selective coupling/decoupling may increase. Further, as a device ages, stiction forces may increase. These factors are sometimes characterized by manufacturers and provided to users of latching relays.

In some embodiments, the relay may be provided separately from the thermostat 10. For example, an input and an output may be provided on the thermostat, with the input and output are controlled in a manner to provide control over a relay disposed in a separate device such as an HVAC system fan, furnace, heat pump, air conditioner, etc. Alternatively, the relay may be an internal component of the thermostat 10, with leads going to and from the relay within the thermostat to provide a power-on or power-off signal. If desired, both an internal relay and an external relay may be used.

Figure 2:
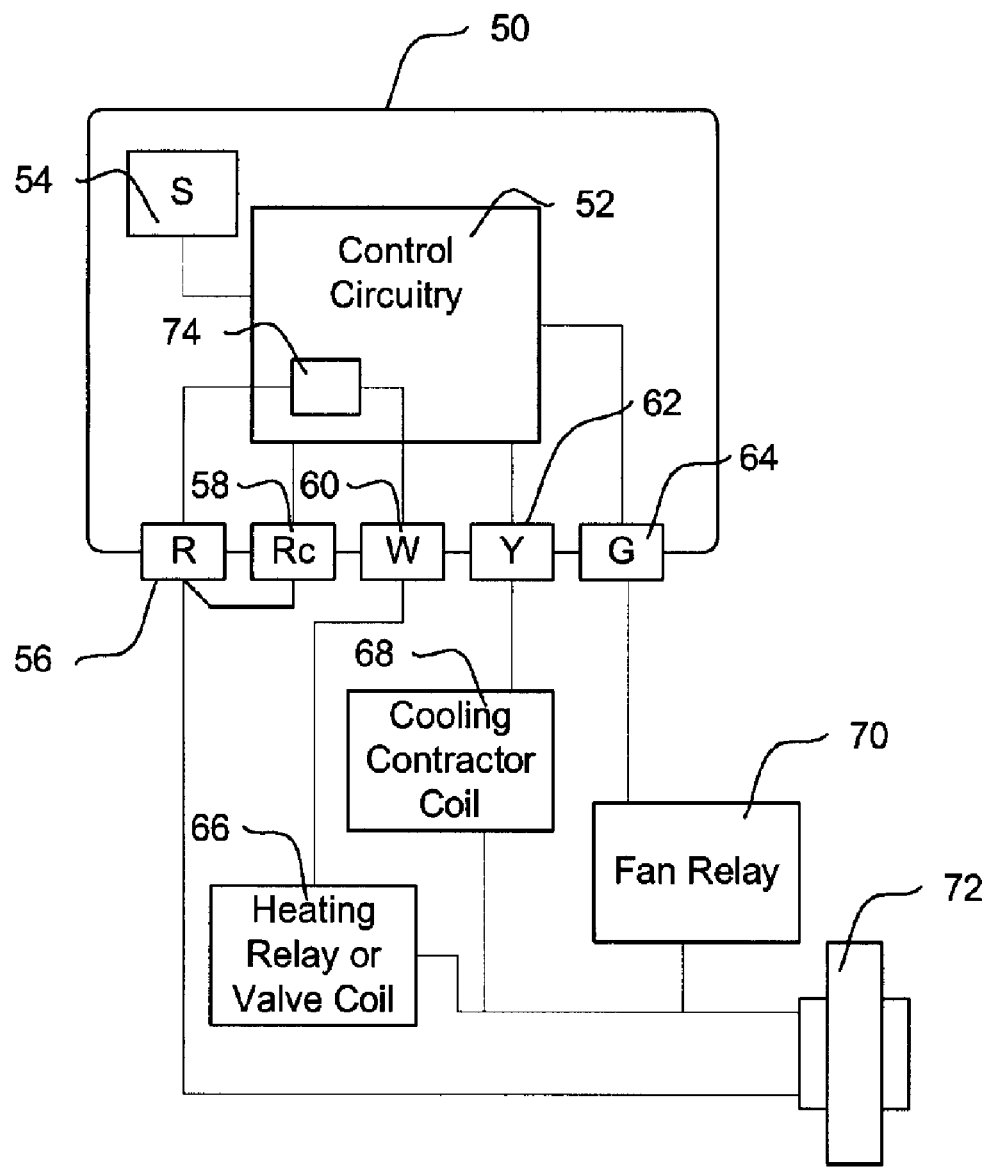
FIG. 2 illustrates another thermostat coupled to additional HVAC system elements.

FIG. 2 shows another illustrative thermostat coupled to additional HVAC system elements. The illustrative thermostat 50 is shown in simplified block form with various elements excluded for illustrative purposes. The thermostat 50 includes control circuitry 52, which is coupled to a sensor 54. The sensor 54 may be an ambient sensor of any desired type. In some embodiments, the sensor 54 may be a temperature sensor.

The control circuitry 52 is shown coupled to a number of thermostat ports. Included are a power port 56, cooling power port 58, heating port 60, cooling port 62, and fan port 64. As shown, relays and coils external to the thermostat 50 are coupled to appropriate ports, including a heating relay or valve coil 66 coupled to heating port 60, a cooling contractor coil 68 coupled to the cooling port 62, and a fan relay 70 coupled to a fan port 64. Power supply 72 provides power for the external relays 66, 68, 70 via the power port 56, which is gated by the control circuitry to the other output ports 60, 62, 64. A jumper may be used as shown between the power port 56 and cooling power 58, if the external system has only one power source 72. In some systems there may be multiple power sources 72 that correspond to different components of the system.

The power source 72 may be, for example, a 24V AC power supply, as is often (though not always) used in HVAC systems. The control circuitry 52 may use one or more relays to couple a port of the power supply 72, via power port 56, to a second port 60, 62, 64, allowing power to flow from the power supply 72 to an associated HVAC system device via the external relays and coils 66, 68, 70.

In an illustrative example, the control circuitry 52 includes a relay for at least one of the system elements, for example a relay 74 coupling the power port 56 to the heating port 60. To set or reset the relay, an electrical pulse may be applied to the relay coil. In an illustrative example of the present invention, the control circuitry 52 may determine the duration and/or amplitude of the applied pulse, using an output of the sensor 54 to determine the duration and/or amplitude of the applied pulse. Relay 74 may display differing characteristics at different temperatures. To reduce power consumption, one or more parameters of the pulse applied to the relay 74 may be modified in light of the temperature sensed by the sensor 54. In this manner, the pulse, while adequate to set or reset the relay 74, is not unduly wasteful.

FIGS. 3A and 3B are charts illustrating empirical data related to example relays that may be used in conjunction with some illustrative embodiments of the present invention. The empirical data of FIGS. 3A and 3B was gathered using commercially available relays. Threshold actuation pulse widths and voltages (amplitudes) were tested repeatedly using the relays, and it was found that linear interpolation could be performed between 25 degrees Celsius and 50 degrees Celsius, as indicated by the inclusion of illustrative intermediate points. It is believed that analogous, though not necessarily identical or even similar, changes in the threshold voltage and pulse width will vary with temperature for other commercially available relay devices.

The illustrative empirical data in FIGS. 3A and 3B may be used, for example, in a look-up table for determining a relay actuation pulse duration and/or level. The data, and the number of data points, may change depending upon the desired system functionality. In another illustrative example, empirical data such as that of FIGS. 3A and 3B may be used in a formula for determining pulse duration and/or pulse amplitude. For example, referring to FIG. 3A, approximate formulas may be:

Pulse Amplitude=$(T+209)/104$(Volts)

Pulse Width=$(T+16.7)/8.33$(milliseconds)

Some additional safety margin may be built into these formulas. Analogous formulas may be calculated for use with the data in FIG. 3B and/or for use with data for other relay devices.

The above example illustrates the use of an ambient condition, such as temperature, to set pulse parameters. Other ambient conditions, such as humidity and particulate concentration, for example, may also affect threshold actuation pulses. In another example, the age of a relay, and/or the number of times the relay is actuated, may also be used to set pulse parameters. For example, some types of latching relays illustrate characteristic curves for actuation pulses that show increasing threshold amplitudes for actuation over time and/or after greater numbers of actuation. In a first example, a threshold actuation pulse for a latching relay may increase with time since a most recent actuation. In another example, a threshold actuation pulse for a latching relay may increase as the number of actuations performed with a particular latching relay increases. These factors may also be taken into account to set one or more parameters of an applied relay actuation pulse.

Figure 4A:
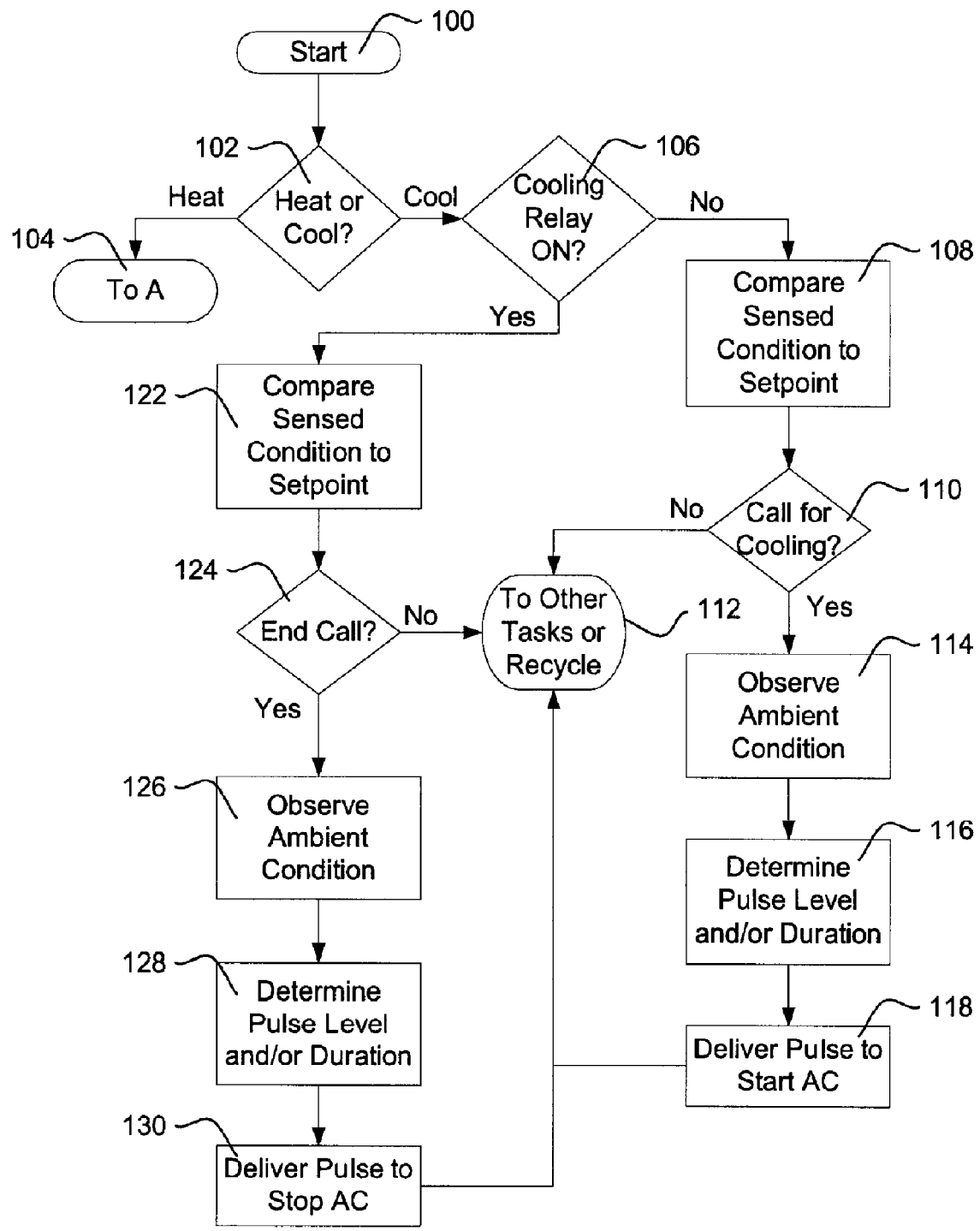
FIGS. 4A-4B show a block diagram of an illustrative subroutine.
Figure 4B:
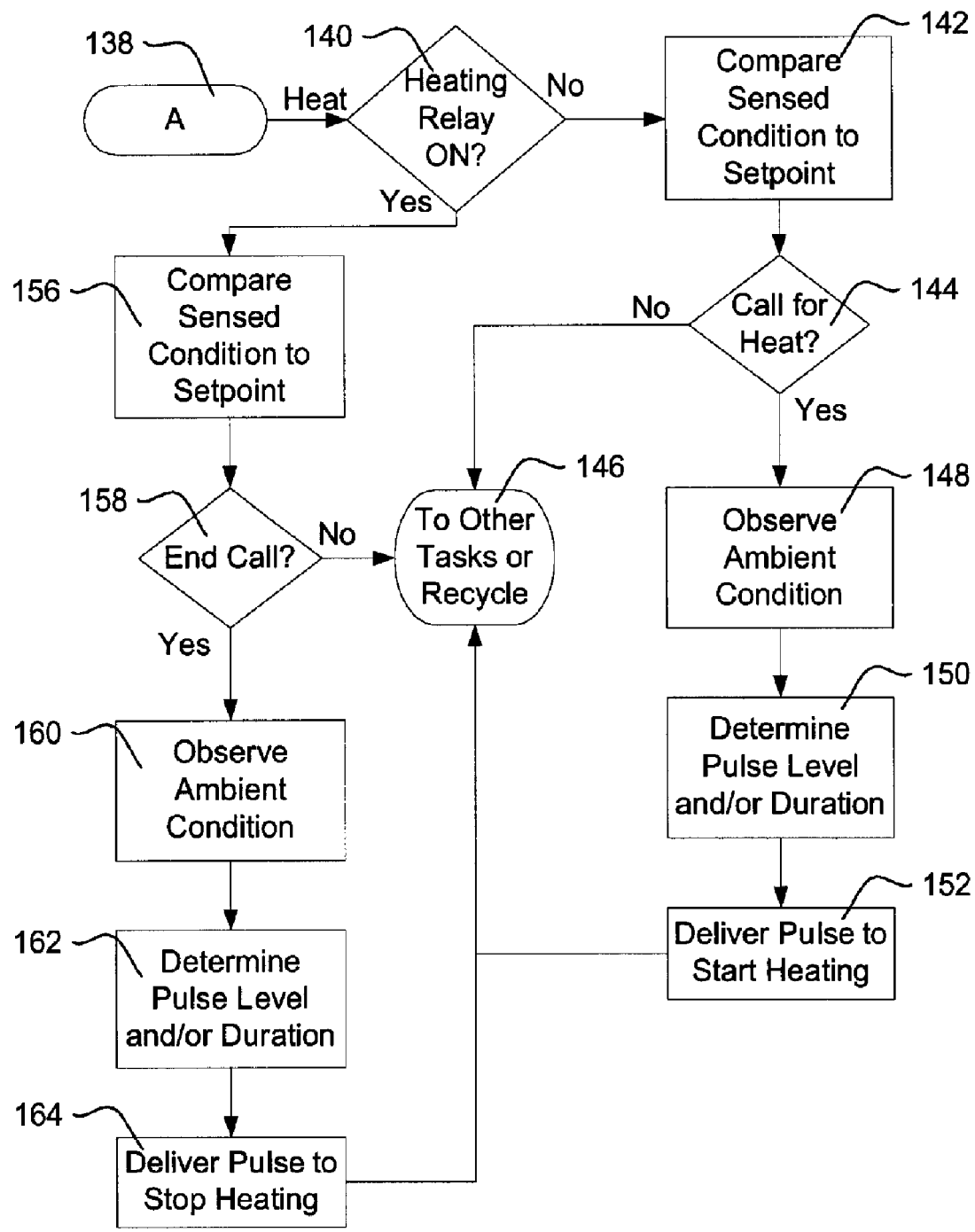

FIGS. 4A-4B show a block diagram of an illustrative subroutine in accordance with the present invention. From a start block 100 the illustrative method determines whether the thermostat is in heating or cooling mode, as shown at 102 (this step may be skipped for a system having a single mode for both heating and cooling). If the system is in heating mode, the method continues to block A in FIG. 4B, as shown at 104. Otherwise, the method continues by determining whether there is an active call (which would have caused the cooling relay to already be set), as shown at 106.

If there is no active call, the method continues to block 108, where a sensed condition (e.g. humidity, temperature and/or other parameter) is compared to a setpoint. It is then determined whether the comparison results in a call for cooling, as shown at 110. If not, the method ends, as shown at 112. Otherwise, the method continues with an observation of an ambient condition, as shown at 114. In some embodiments, temperature is the ambient condition observed, though other ambient conditions that affect relay operation and/or performance may be observed (for example humidity).

After observation of the ambient condition at 114, a pulse amplitude and/or pulse duration is determined as shown at 116. Which parameter and/or whether both parameters are modified may be dependent upon the characteristics of the particular relay in use. In some embodiments other pulse parameters may be considered, including, for example, pulse shape (for example, variations on sinusoidal, square, or ramped signal).

In some embodiments, instead of, or in addition to, adjustment of pulse parameters in light of ambient conditions, pulse parameters may also be adjusted to account for the age of the relay, the number of actuations the relay has undergone and or stress on the relay. For example, one or both of the pulse width or amplitude may be adjusted to account for such factors. In some embodiments, a counter may be used to determine how often the relay has been actuated, and the counter may be incremented at each actuation of the relay, for example. An aging counter may be used to estimate the age of the system relay as well.

Next a pulse is delivered to start air conditioning, as shown at 118. Any suitable circuitry and method may be used for such pulse delivery, as, for example, the use of a digital-to-analog converter to provide amplitude control and observation of a clock signal to provide pulse duration control. The method may then go on to other tasks, or recycle, as shown at 112.

Going back to step 106, if there is an active call for cooling, the method continues at step 122 instead. Here, a sensed condition is again compared to a setpoint (again, some illustrative conditions include temperature and humidity). Next, it is determined, as shown at 124, whether the cooling call should end. If not, the method goes to other tasks or recycles, as shown at 112.

In some embodiments, the comparison at 122 may also include comparisons related to the use of different cooling sources. If, for example, fresh air ventilation is available, and an outdoor temperature sensor indicates that a fresh air damper may be used to infuse cooling air in place of mechanical cooling, the method may be used to end the call for mechanical cooling, even though a call for cooling itself remains active. Thus, in some embodiments, "active call" at 106 may refer to whether mechanical cooling is active. Mechanical cooling may also be used to reduce humidity in an enclosed space, with some other manner used to maintain temperature (for example, electric heating, as shown in U.S. patent application Ser. No. 10/632,788, entitled METHOD AND APPARATUS FOR CONTROLLING HUMIDITY WITH A HEATER UNIT AND A COOLER UNIT, which is incorporated herein by reference; or fresh air infusion of warm outdoor air). Those of skill in the art will recognize that the present systems and methods may be further adapted for other such systems, including that of the Ser. No. 10/632,788 U.S. patent application.

If the call for cooling should end at 124, the method goes to step 126. At 126, an ambient condition is observed, similar to step 114. The pulse level and/or duration is then determined, as shown at 128. The pulse is delivered to stop mechanical air conditioning or cooling, as shown at 130. The method goes to other tasks or recycles, as shown at 112.

Referring now to FIG. 4B, the method continues from FIG. 4A by reference to "A", shown at 138. As indicated, the system is determined to be in heating mode. It is then determined, as shown at 140, whether there is an active call for heat that has caused the heating relay to be set. If not, the method continues at 142 by comparing a sensed condition to a setpoint. It is next determined, as shown at 144, whether a call for heat should occur. If not, the method goes to other tasks or recycles, as shown at 146. Otherwise, the method continues at 148.

As shown at 148, the method continues in similar manner as step 114 (FIG. 4A) above, by observing an ambient condition. The pulse level and/or duration are then determined, as shown at 150, and a pulse is delivered to start heating, as shown at 152. The method goes to other tasks or recycles, as shown at 146. In some embodiments, rather than, or in addition to, observing an ambient condition, age, use, or other factors may be used to set pulse parameters.

Going back to step 140, if there is an active call for heat ongoing and the heating relay is ON, the method continues at 156 by comparing a sensed condition to a setpoint. As shown at 158, the next step is to determine whether the call for heat should end. If not, the method goes to other tasks or recycles, as shown at 146. If the call for heat should end, then the method continues by observing an ambient condition, as shown at 160, determining a pulse level and/or duration, as shown at 162, and delivering a pulse to stop heating, as shown at 164. After the pulse is delivered, the method goes to other tasks or recycles, as shown at 146

Depending upon the system, the pulse levels and/or durations, taken in light of ambient conditions, may vary depending upon which relay (a relay for the cooling circuit loop or a relay for the heating circuit loop) is used. Further, consideration of multiple relays may be a part of step 152 (as well as steps 116, 128, and 162), as both a cooling/heating relay and a relay for ventilation fan may be actuated.

Figure 5:
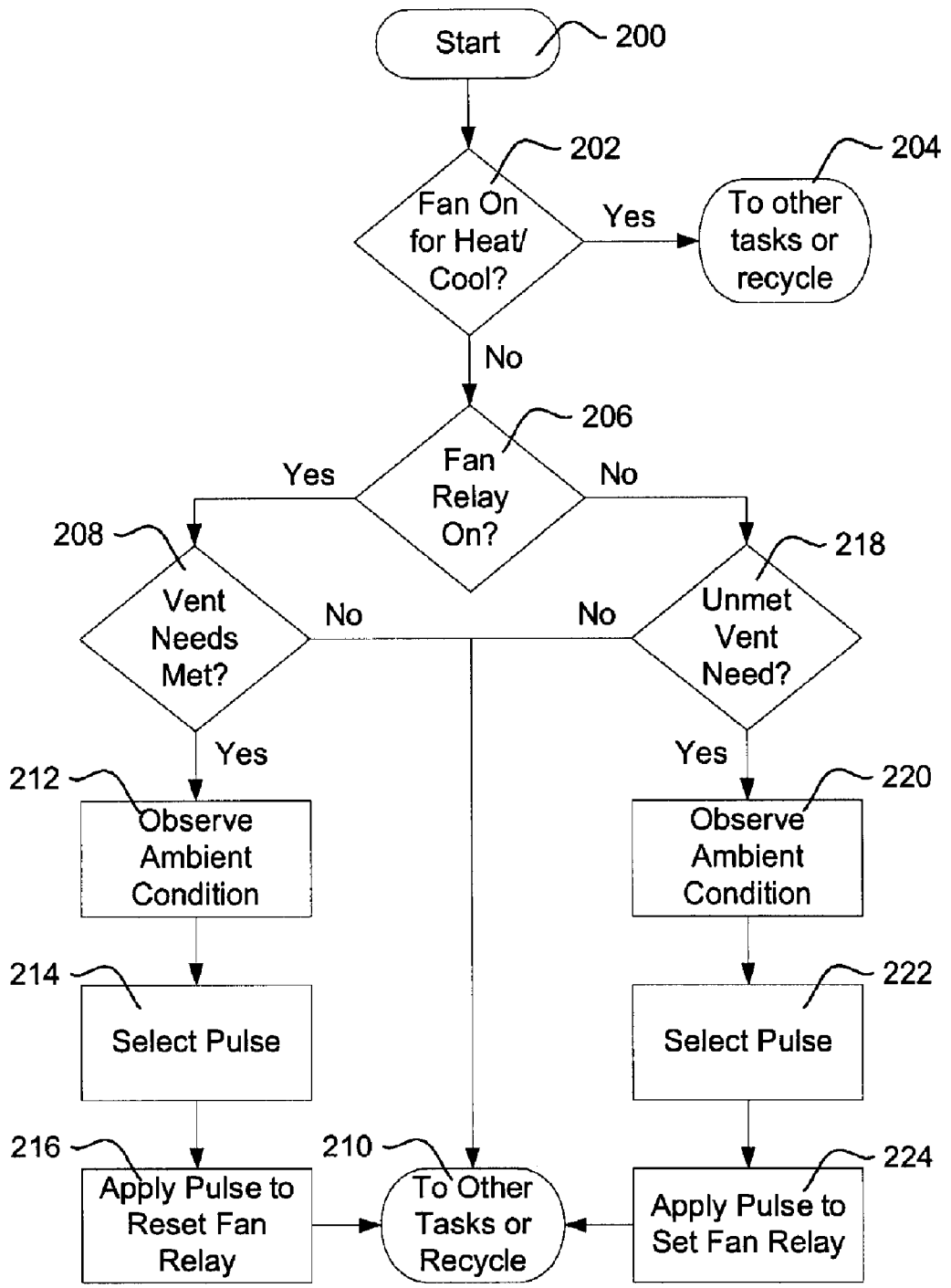
FIG. 5 shows a block diagram for another illustrative subroutine.

FIG. 5 shows a block diagram for another illustrative subroutine of the present invention. This subroutine addresses system ventilation. Some illustrative fresh air ventilation methods are shown and described in co-pending U.S. patent application Ser. No. 10/758,838, filed Jan. 16, 2004, and entitled FRESH AIR VENTILATION CONTROL METHODS AND SYSTEMS, which is incorporated herein by reference. For systems equipped with this and other ventilation functionality, additional methods similar to those herein may be used even where system actuation is not necessarily a result of a sensed ambient condition.

From a start block, shown at 200, the subroutine determines whether the fan is ON due to heating or cooling calls, as shown at 202. If so, the subroutine goes to other tasks or recycles at 204. Step 202 may also include determining whether a user preference "FAN ON" condition exists, wherein the fan is ON and remains ON due to the user selecting an always-on fan mode; if so the subroutine goes to other tasks or recycles at 204.

If the fan is not ON due to a heating/cooling call at 202, the subroutine continues by observing whether the fan is ON for any other reason, which may include a fresh air ventilation reason. If the fan is ON, the subroutine continues at 208, where it may be determined whether ventilation needs have been met. If not, the fan remains ON and the subroutine goes to other tasks or recycles at 210.

If the ventilation needs have been met, the fan may be turned OFF. To cause fan turn-off, the subroutine goes to step 212, where an ambient condition is observed. A pulse is then selected, as shown at 214, with the pulse duration, amplitude, shape and/or other parameters being modified in light of the observed ambient condition. The pulse is then applied to reset the relay, as shown at 216, and the subroutine goes to other tasks or recycles at 210. Resetting the relay at step 216 may, effectively, turn the fan OFF. As noted above, rather than an ambient condition, other parameters of device operation may also be observed to set pulse parameters.

Returning to step 206, if the fan is not ON, it is determined whether there are unmet current ventilation needs, as shown at 218. If not, the subroutine goes to other tasks or recycles at step 210. Otherwise, an ambient condition or other parameter of device operation is observed, as shown at 220, and a pulse is selected as shown at 222. The pulse is applied to set the relay as shown at 224, and the subroutine goes to other tasks or recycles at 210. Setting the relay at step 224 may, effectively, turn the fan ON.

Those skilled in the art will recognize that the present invention may be manifested in a variety of forms other than the specific embodiments described and contemplated herein. Accordingly, departures in form and detail may be made without departing from the scope and spirit of the present invention as described in the appended claims.

What is claimed is:

1. A thermostat for managing one or more conditions in a controlled space, the thermostat comprising:
    a temperature sensing element for sensing a current sensed temperature, resulting in a current sensed temperature value;
    a relay;
    a controller coupled to the temperature sensing element and the relay, the controller applying an electrical pulse to the relay to selectively actuate the relay, wherein the controller is configured to reduce power consumption by setting at least one parameter of the electrical pulse to a value that is dependent on the current sensed temperature value such that the electrical pulse is sufficient to actuate the relay without undue waste of energy.

2. The thermostat of claim 1 wherein the relay is a latching relay.

3. The thermostat of claim 1 wherein the electrical pulse has a duration and an amplitude, and the controller is configured to set at least one of the duration of the electrical pulse and the amplitude of the electrical pulse according to the sensed temperature.

4. The thermostat of claim 1 wherein the electrical pulse has a duration and an amplitude, and the controller is configured to set both the duration and the amplitude of the electrical pulse according to the sensed temperature.

5. The thermostat of claim 1 wherein the thermostat is configured for use in an HVAC system, and wherein the relay is configured for relaying power for at least one of a ventilation system, a heating system, or an air conditioning system.

6. The thermostat of claim 1 wherein the controller has access to a lookup table for determining parameters for the electrical pulse based on the temperature.

7. The thermostat of claim 1 wherein the controller uses a formula to determine parameters for the electrical pulse according to the temperature.

8. A thermostat for managing one or more conditions in a controlled space, the thermostat comprising:
   a temperature sensing element for sensing a current sensed temperature;
   a relay;
   a controller coupled to the temperature sensing element and the relay, the controller applying an electrical pulse to the relay to selectively set or reset the relay, wherein the controller is configured to set at least one parameter of the electrical pulse to a value that is dependent on the current sensed temperature;
   wherein the electrical pulse has an amplitude and a duration, and the controller is configured such that, at a first temperature the electrical pulse has a first duration and a first amplitude, and at a second temperature higher than the first temperature, the electrical pulse has a second duration and a second amplitude, wherein at least one of the following conditions is true:
   the second duration is longer than the first duration;
   the second amplitude is greater than the first amplitude.

9. A thermostat for managing one or more conditions in a controlled space, the thermostat comprising:
   a relay, the relay having a temperature dependent switching characteristic that when the relay is at a higher temperature, an electrical switching pulse needs to be more energetic to actuate the relay than when the relay is at a lower temperature;
   a temperature sensing element for sensing a current temperature in or around the relay; and
   a controller coupled to the temperature sensing element and the relay, the controller applying an electrical switching pulse to the relay to selectively actuate the relay, wherein the controller is configured to provide a more energetic electrical switching pulse when the temperature sensing element senses a higher temperature than when the temperature sensing element senses a lower temperature.

10. The thermostat of claim 9 wherein the relay is a latching relay.

11. The thermostat of claim 9 wherein the electrical pulse has a duration and an amplitude, and the controller is configured to set at least one of the duration of the electrical pulse and the amplitude of the electrical pulse according to the sensed temperature of the relay.

12. The thermostat of claim 9 wherein the electrical pulse has a duration and an amplitude, and the controller is configured to set both the duration and the amplitude of the electrical pulse according to the sensed temperature of the relay.

13. The thermostat of claim 9 wherein the thermostat is configured for use in an HVAC system, and wherein the relay is configured for relaying power for at least one of a ventilation system, a heating system, or an air conditioning system.

14. The thermostat of claim 9 wherein the controller has access to a lookup table for determining parameters for the electrical pulse using the temperature.

15. The thermostat of claim 9 wherein the controller uses a formula to determine parameters for the electrical pulse according to the temperature.

16. A thermostat for managing one or more conditions in a controlled space, the thermostat comprising:
   a relay;
   a temperature sensing element for sensing a temperature in or around the relay; and
   a controller coupled to the temperature sensing element and the relay, the controller applying an electrical pulse to the relay to selectively set or reset the relay, wherein at least one parameter of the electrical pulse is dependent on the sensed temperature of the relay;
   wherein the electrical pulse has an amplitude and a duration, and the controller is adapted such that, at a first temperature the electrical pulse has a first duration and a first amplitude, and at a second temperature higher than the first temperature, the electrical pulse has a second duration and a second amplitude, wherein at least one of the following conditions is true:
   the second duration is longer than the first duration;
   the second amplitude is greater than the first amplitude.

* * * * *